United States Patent [19]
Heller et al.

[11] Patent Number: 6,059,465
[45] Date of Patent: May 9, 2000

[54] TEST MATERIAL STORAGE AND FEED DEVICE

[75] Inventors: Martin Heller, Zurich; Hugo Knecht, Schöfflisdorf, both of Switzerland

[73] Assignee: Gretag Imaging AG, Regensdorf, Switzerland

[21] Appl. No.: 09/073,440

[22] Filed: May 6, 1998

[30] Foreign Application Priority Data

May 6, 1997 [EP] European Pat. Off. .............. 97107461
Mar. 30, 1998 [EP] European Pat. Off. .............. 98105788

[51] Int. Cl.[7] .......................... G03D 13/00; G03D 17/00; G03B 27/32
[52] U.S. Cl. .......................... 396/578; 396/602; 396/638; 355/27
[58] Field of Search ................................ 396/638, 512, 396/642, 647, 648, 599, 513, 602, 578, 612; 355/27–29

[56] References Cited

U.S. PATENT DOCUMENTS

| 4,335,956 | 6/1982 | Findeis et al. ............................ 355/27 |
| 4,406,534 | 9/1983 | Viehrig et al. ........................... 396/612 |
| 5,864,728 | 1/1999 | Earle et al. .............................. 396/638 |

FOREIGN PATENT DOCUMENTS

| 0 437 814 A1 | 7/1991 | European Pat. Off. . |
| 0 601 193 A1 | 6/1994 | European Pat. Off. ........ G03B 27/46 |
| 0 610 811 A1 | 8/1994 | European Pat. Off. ....... G03D 13/00 |
| 0 629 916 A2 | 12/1994 | European Pat. Off. . |
| 0 670 519 A1 | 9/1995 | European Pat. Off. . |
| 61-292642 | 12/1986 | Japan ............... G03D 3/00 |
| 1-216356 | 8/1989 | Japan ............... G03D 3/08 |

Primary Examiner—D. Rutledge
Attorney, Agent, or Firm—Burns, Doane, Swecker & Mathis, LLP

[57] ABSTRACT

The invention relates to a test material storage and feed device with a light-proof container, into which either chemical film test strips, or pre-exposed photographic paper sections can be inserted. The container has a delivery mouth for taking the test strips or paper sections out of the container. A connecting device can be provided on the delivery mouth of the container which can be placed against a corresponding feed opening of a printer or a film processor, or can be inserted at least partially into the feed opening.

13 Claims, 3 Drawing Sheets

TEST MATERIAL STORAGE AND FEED DEVICE

BACKGROUND OF THE INVENTION

1. Field of the Invention

The invention relates to a test material storage and feed device with a light-proof container for receiving photographic material as the test material. The container has a delivery mouth for delivering the photographic material in the form of test sections from the container. Further, the invention relates to a photographic printer, which is equipped with a test material storage and feed device.

2. Description of Related Art

In connection with further processing of photographic film, it is required, on one hand, to develop the negative or positive film and, on the other hand, to transfer the film onto photographic paper, when required, in order to produce paper prints of the positive, or negative film. In the course of film processing, various types of chemicals are employed in development sections of appropriate photographic film processing installations. In this case, it is necessary to test whether the properties of developing chemical baths, through which the photographic material is conducted, lie within the tolerance interval, or whether the developer solutions need to be replaced or treated so that they again have sufficient developing power.

When checking the developer solutions, chemical film test strips are employed in a film processor, and are conducted through the developing area of a film processor. In this case, the chemical film test strips have a predefined exposure. Following development, the density of the chemical film test strip is measured in a transmission densitometer in order to draw conclusions regarding the state of the developer solutions, rinsing baths, etc., on the basis of the measurement results. Until now, it was necessary for the operators to cut off a defined piece of film from a test film roll in a darkroom and to insert it into a film cartridge, which could be connected to the film processor. Subsequently, the cartridge was inserted into a film loading cassette. A leader card was set in front of the test film section, glued to the test film section and subsequently inserted, by the film loading cassette, into the film processor. The leader card was conducted through its development area and taken out again at its end in order to be able to perform the above-mentioned transmission density measurement. By means of notch markings of the test film on the film roll the operators can determine where the required test film strip must be cut off the test film roll.

Corresponding problems also exist in the development areas of paper processors. In order to be able to check or measure the chemical status of photographic paper processors, the producers of copying paper make available so-called test strips in the form of individual sheets. These test strips have already been pre-exposed with a pre-defined test pattern. For a chemical test, a test strip is transported through the paper processor or the entire minilab, where, in the latter case, no exposure takes place in the printer. Thereafter, the developed test strip is measured with a colorimeter to obtain information regarding the state of the treatment baths in the paper processor.

One such test strip is customarily inserted into a cassette which is specially designed for this test, and the cassette is connected to the normal paper outlet of the printer, or minilab. As a result of a manual control command, the test strip is taken out of the cassette by a motor and placed into the normal paper path of the minilab and fed to the paper processor.

Thus, in accordance with the above process, for every chemical test it is necessary to remove the paper cassette containing the copying paper supply and to put the test strip cassette in its place, and to replace the test strip cassette with the copying paper supply when the test is finished. Performing a chemical test in this way is relatively cumbersome and inconvenient.

SUMMARY OF THE INVENTION

It is an object of the present invention to provide an apparatus for checking the chemical state of developing devices associated with treatment or development baths in either a film processor, or a photographic printer in a simpler and easier way.

The advantages which can be achieved in accordance with the instant invention are based on a test material storage and feed device, which is provided with a connecting device which easily attaches to a film processor. In this case, the connecting device can be inserted into a feed slot for film materials, for example, in order to insert a film test strip into the film processor, or the film processor section of a printer.

The connecting device can be inserted at least partially into the insertion slot, or an insertion area of a film processor or the film processor section of a photographic printer. This assures light-proof feeding of a chemical film test strip.

In this embodiment, operators can take the light-proof container with a multitude of chemical film test strips or a roll of adjoining chemical film test strips as needed from a refrigerator or the like, where a leader card can be glued to the film start extending out of the delivery mouth of the light-proof container. The operators can attach the device in accordance with the invention to a film processor or the film processor section of a printer, where the chemical film test strip with the leader card glued to it can be inserted into the film processor, via the connecting device.

The light-proof container can also have a cover which can be opened for the delivery of a test section (i.e., a chemical film strip or a pre-exposed photographic paper section). In one exemplary embodiment, the delivery mouth can also be made light-proof by means of one or several felt strips. The felt strips can also be made more resistant by means of pressure devices, for example a resilient piston, or perhaps also in the form of a sponge or a pillow made of a foamed material.

The connecting device can be attached reversibly to the container, where a connecting or separating mechanism (i.e., a connecting/separating mechanism) assures the reversible attachment. Different connecting or separating mechanisms can be used here, such as reversible snap-in devices, pushing elements or the like. It is also possible for locking the device in accordance with the invention to the film processor or the printer, to provide an appropriate reversible covering device to the test material storage and feed device or printer, in accordance with the invention.

The connecting device can also be provided with a sensor device for checking the length of an inserted test material section. The sensor device detects a marking, such as a notch or the like to trigger a separating tool of a separating device, such as a cutter, which cuts off the respective test material section perhaps from an endless material body (e.g., a film roll).

To the extent that the testing material (e.g., pre-exposed photographic paper) is temperature-sensitive, the light-proof container can also be provided with a cooling device. Several devices can be used, including cooling means in connection with a heat pump and electrical devices, such as Peltier elements.

BRIEF DESCRIPTION OF THE DRAWINGS

The present invention can be further understood with reference to the following description and appended drawings, wherein like elements are provided with the same reference numerals. In the drawings.

DETAILED DESCRIPTION OF THE PREFERRED EMBODIMENT

Figure 1:
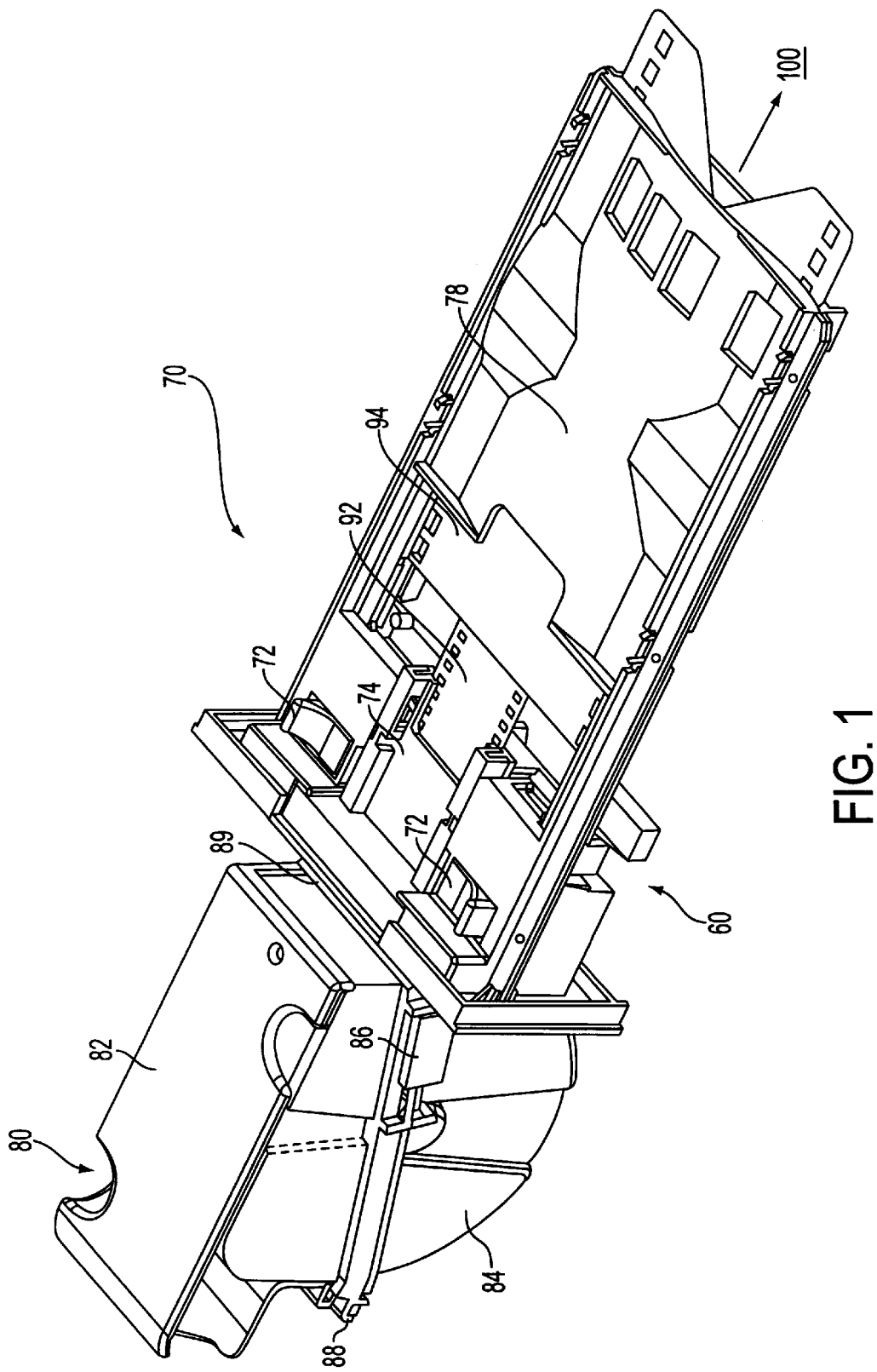
FIG. 1 illustrates an exemplary test material storage and feed device in accordance with the invention for chemical film test strips in a perspective view.

A test material storage and feed device 60, is illustrated in FIG. 1 in accordance with exemplary embodiments of the present invention. The test material storage and feed device 60 has a light-proof container 80 and a connecting device 70. The light-proof container 80 has a delivery mouth 89 on the end which faces the connecting device 70, through which a chemical film test strip 92 can be inserted into the connecting device 70.

The light-proof container 80 has an upper section 82 and a lower section 84, which can be separated, for example, in order to insert a roll of chemical film test strips. A separation line between the upper section 82 of the container 80 and the lower section 84 starts at a hinge area 88 and extends as far as the covering device 86 or the delivery mouth 89. The covering device 86 can be used for closing the container 80 in a light-proof manner when the connecting device 70 has been removed from the container 80. Furthermore, a connecting or separating mechanism can be provided in this area in order to fix the test material storage and feed device 60 in place on a film processor (not shown) or a printer (not shown), where the test material or the chemical film test strip 92 can be pulled out and conveyed in the direction of the arrow 100.

To be able to insert a fresh roll of test strips 92 or individual test strips, into the container 80, one of the sections 82, 84 of the container 80 can be tilted away or removed. The connecting device 70 has a threading section 74, through which a chemical film test strip 92 can be removed from the container 80 in a light-proof manner. The container 80 can be reversibly connected with the connecting element 70 by means of a connecting or separating mechanism (i.e., connecting\separating mechanism), of which only slide elements 72 have been represented here. The container 80 and the connecting device 70 can be separated from each other by actuating the slide elements 72. A cover provided on the delivery mouth 89 can automatically snap shut in the course of the separation, in order to prevent light from penetrating into the interior of the container 80. In another exemplary embodiment of the present invention, it is also possible to use a felt strip (not shown), which is resiliently seated on a pillow of foam material, for making the delivery mouth 89 light-proof. Otherwise, a snap or slide closure, which is pre-stressed by a spring and which closes the delivery mouth in a light-proof manner in the closed state, can be used as a cover.

A leader card 94 is maintained in a holder 78 at the end of the connecting device 70 facing away from the container 80 in such a way that the chemical film test strip 92 can be placed on the leader card 94 in an aligned manner, for example, by gluing.

Figure 2:
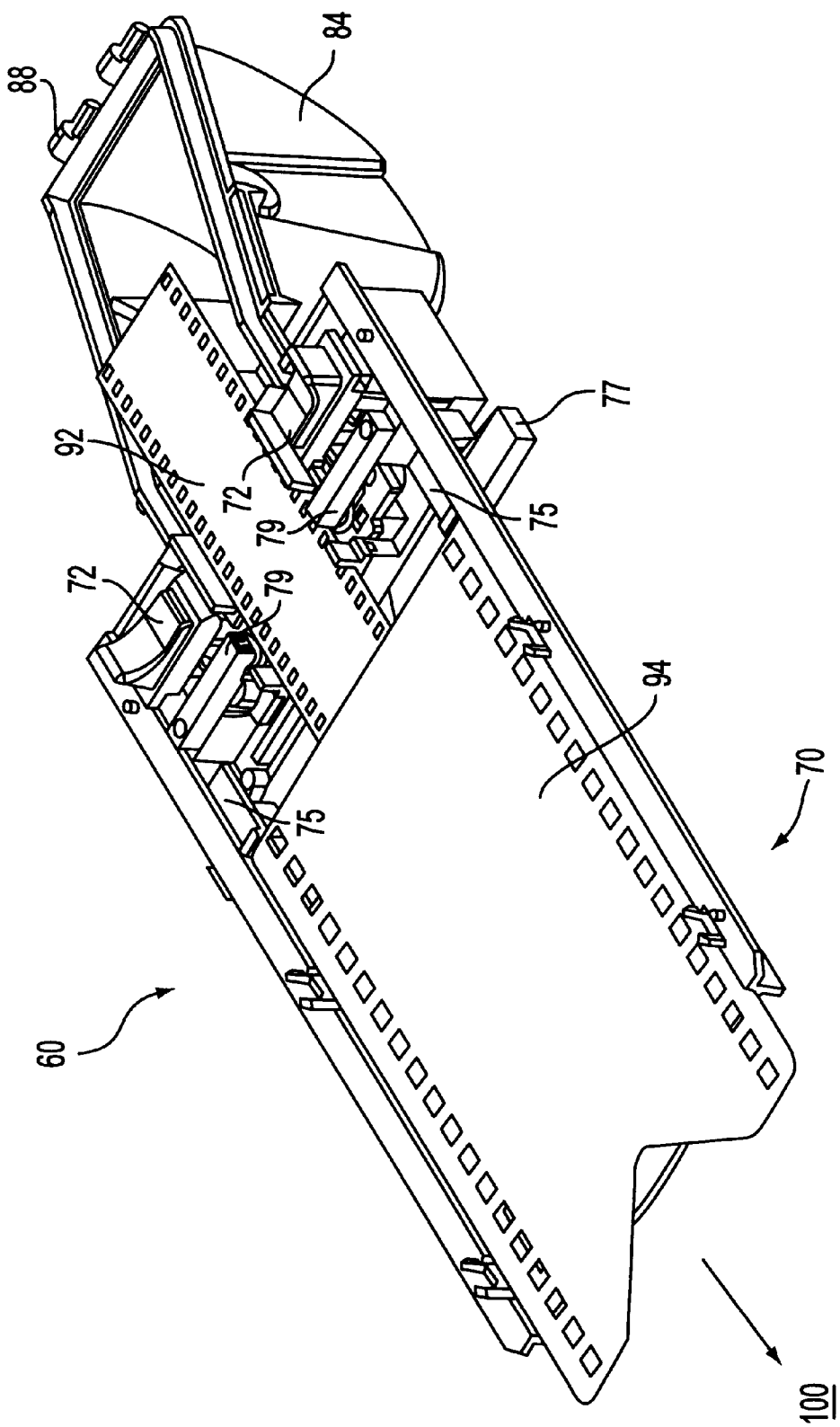
FIG. 2 illustrates a perspective view of the lower section of the exemplary embodiment of the test material storage and feed device shown in FIG. 1.

In accordance with an exemplary embodiment of the present invention, FIG. 2 illustrates the test material and storage device 60 without the upper section 82 of the container so that a view of the lower section 84 of the container 80 is visible. The connecting device 70 has sensor devices 79, which scan the edge of the chemical film test strip 92 for markings. In an exemplary embodiment of the invention, notches are scanned for by sensor devices 79. As soon as a notch has been found at an edge of the test strip 92, a signal is transmitted to a separating device which includes a trigger device 77 that triggers a separating tool (not shown), such as a cutter, in order to separate a test strip 92 of a desired length from the film roll having a plurality of test strips 92.

In another embodiment, rollers are provided on "film notch levers" 79, which snap into the notches at the test strip 92, where a lever performs a pivot movement in the direction 100 of running of the film in order to trigger the trigger device 77 (e.g., a sensor), for actuating the separating too. The separating tool can be arranged above the light-proof container and cuts the film through in the area between the leader card 94 and the film. Now, the chemical film test strip on the leader card 94 can be guided through the developing device of the film processor, if the connecting device has been arranged in its matching position on the film processor.

Figure 3:
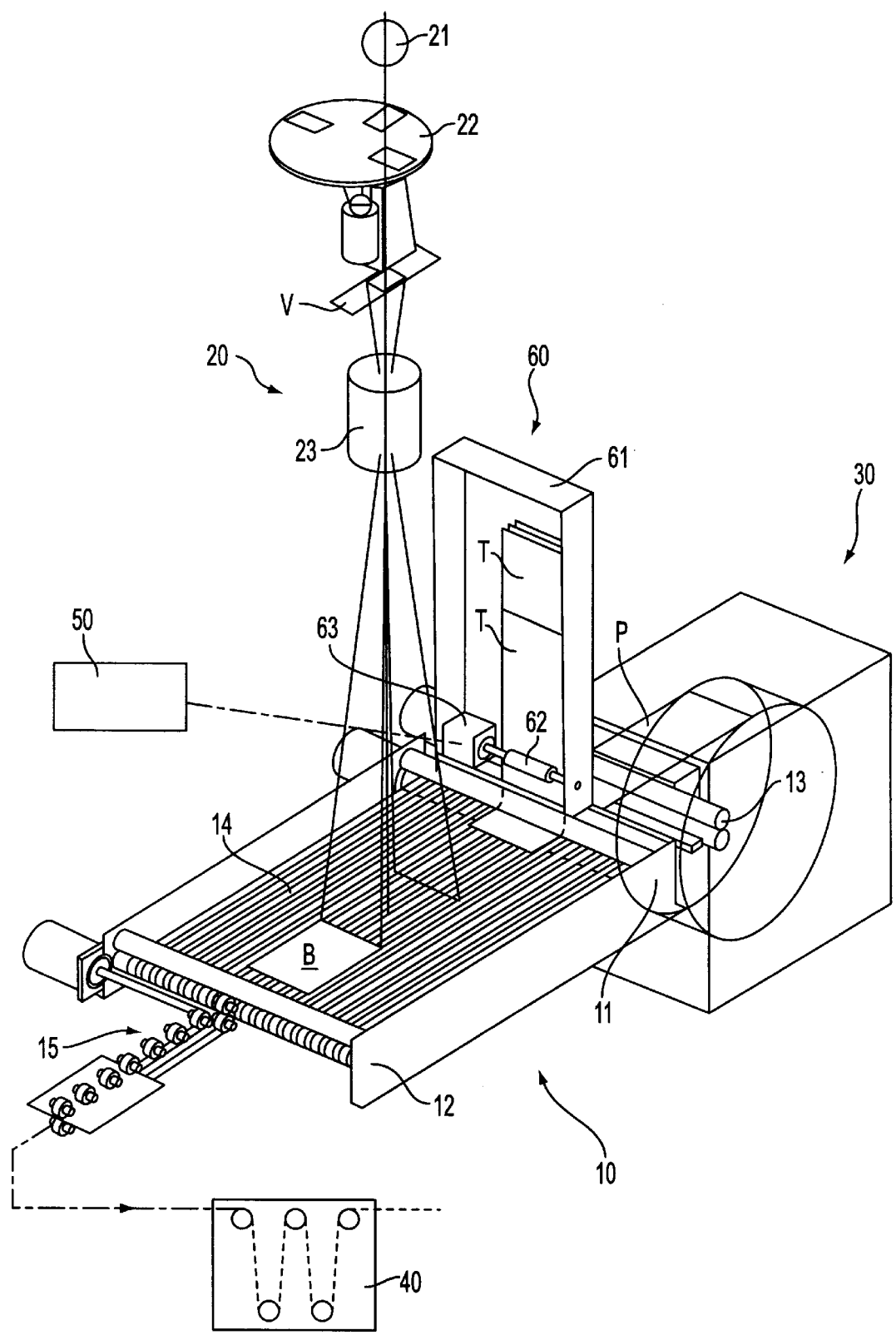
FIG. 3 illustrates a test material storage and feed device for pre-exposed photographic paper strips on a photographic printer in a perspective schematic view in accordance with an exemplary embodiment of the present invention.

FIG. 3 shows a schematic representation of the elements of another exemplary embodiment of the photographic printer in accordance with the invention having a test material storage and feed device 60.

The photographic printer represented comprises a paper stage 10 with an inlet side 11 and an outlet side 12, as well as exposure means 20, arranged above the paper stage, for the exposure corresponding to a copy pattern V of the image area of unexposed photographic sheet material B on the paper stage. The exposure means 20 comprise a print light source 21, means for coloring the print light, symbolically represented as a filter wheel 22, and a production lens 23.

A paper cassette 30, which can be connected and disconnected with a supply of unexposed photographic copy paper P, and a first transport means 13 which pulls copy paper out of the paper cassette 30, cuts off sheets of a required length and feeds these sheets, B, to the paper stage 10, are located on the inlet side 11 of the paper stage 10. Second transport means 14 are located in the paper stage 10, which transport the sheet material B, fed to them, over the paper stage from the inlet side 11 to the outlet side 12. A third transport means 15 is located on the outlet side 12 of the paper stage 10 which takes over the sheet material B, exposed on the paper stage, from the paper stage and feeds it to a paper processor 40 located downstream of the printer. A control device 50 works together with the transport means 13, 14 and 15 and the exposure means 20 and controls their functions.

To this extent the represented photographic printer corresponds to conventional printers suitable for single- sheet processing, such as minilabs, so that a more detailed explanation is not necessary for one skilled in the art.

In accordance with another exemplary embodiment of the invention, the printer is additionally equipped with a feed device 60 for pre- exposed photographic material (test strips), T. This feed device 60 is arranged on the inlet side 11, above the paper stage 10. The feed device 60 feeds, following an appropriate triggering command, a single sheet, T, of the pre-exposed photographic test material, (i.e., a test strip) onto the paper stage 10 in cooperation with the control device 50. The sheet is grasped by the second transport means 14 and further conveyed like the unexposed individual sheets B of the copy paper discussed above.

The feed device 60, releasably connected to the printer, comprises a cassette 61, which is capable of receiving a plurality of test strips T (e.g., approximately twenty), as well as a delivery device constituted by a transport roller 62 and a drive motor 63. The feed device 60 is controlled by the control device 50, and ejects a single test strip T from the cassette 61 and conveys it to the paper stage 10.

If the chemical components of the paper processor 40 connected downstream of the printer are to be tested, an operator informs the control 50 by entering an appropriate command. For example, the operator would push the appropriate key to start the test. The control device 50 then triggers the delivery of a test strip T from the feed device 60. The test strip T is transported (without exposure) over the paper stage 10 and fed to the downstream-arranged paper processor 40. After leaving the paper processor, the developed test strip is measured in the known manner by means of a colorimeter (not shown). As a result, information regarding the state of the chemical components is obtained by means of the measurement results.

A test material can change because of aging or subsequent ripening of the emulsion. As a result, color displacement can occur, which would make a test result with usable information regarding the suitability of the chemical components for development impossible. By means of a cooling device (not shown), for example one, or more Peltier elements can be used to reduce unwanted change and deterioration of the test material.

The frequent disconnection of the paper cassette for a chemical test can be omitted by means of the feed device for test strips in accordance with the invention, so that such chemical tests can be performed considerably simpler and easier in comparison to the prior art.

It will be appreciated by those skilled in the art that the present invention can be embodied in other specific forms without departing from the spirit or essential characteristics thereof. The presently disclosed embodiments are therefore considered, in all respects, to be illustrative and non-restricted. The scope of the invention is indicated by the scope of the appended claims rather than the foregoing description and all changes that come within the meaning and range and equivalence thereof are intended to be embraced therein.

What I claim is:

1. A test material storage and feed device comprising:

a light-proof container for receiving photographic material as a test material, wherein the container has a delivery mouth for delivering the photographic material as a test section from the container; and a connecting device placed against the delivery mouth, said connecting device being at least one of placed against and placed partially into a corresponding inlet opening of at least one of a printer and a film processor device, wherein the connecting device can be reversibly placed against the container, and the container together with the connecting device, can be placed reversibly against at least one of said film processor device and said printer, and wherein a connecting/separating mechanism assures a possibility of reversible placement.

2. The device in accordance with claim 1, further comprising:

a cover, arranged at the delivery mouth of the container, which can be opened for removing said test section of said photographic material.

3. The device in accordance with claim 1, wherein said connecting/separating mechanism has at least one of an engagement and a snap-on section which is provided on at least one of either the container and the connecting device.

4. The device in accordance with claim 1, wherein the connecting device has a sensor device to detect a marking on the test section of the photographic material.

5. The device in accordance with claim 1, comprising:

a separating device, arranged near the delivery mouth of the connecting device, for separating the test section of the photographic material from a supply body, wherein the separating device becomes active upon a signal, which is output by a sensor device.

6. The device in accordance with claim 1, comprising:

a guide area provided in an area of the connecting device, into which a leader card can be inserted and guided, wherein the test section can be connected with the leader card.

7. The device in accordance with claim 1, wherein the light-proof container can be connected to a cooling device.

8. The device according to claim 7, wherein said cooling device includes at least one Peltier device.

9. The device in accordance with claim 1, comprising:

a delivery means for removing the test material from the light-proof container, wherein said delivery means can be controlled by a control device.

10. The device in accordance with claim 1, wherein the test material is at least one of a pre-exposed sheet material and an exposed chemical film test strip.

11. A photographic printer comprising:

a paper stage having an inlet side and an outlet side;

first transport means for feeding unexposed photographic sheet material to the inlet side of the paper stage;

second transport means for moving the sheet material over the paper stage from the inlet side to the outlet side;

third transport means for removal of the sheet material on the outlet side of the paper stage;

exposure means for the exposure of an image area of the sheet material located on the paper stage;

a control device which controls all said transport means and the exposure means; and a testing material storage and feed device which further includes:

a light-proof container for receiving photographic material as a test material, wherein the container has a delivery mouth for delivering the photographic material as a test section from the container; and a connecting device placed against the delivery mouth, said connecting device being at least one of placed against and placed partially into a corresponding inlet opening of at least one of a printer and a film processor device.

12. The printer in accordance with claim 11, wherein the control device of the printer controls, the delivery means for delivering individual sections of said photographic sheet material.

13. The printer in accordance with claim 11, further comprising:

a paper processor for producing photographic copies.

* * * * *